US006934873B2

(12) United States Patent
Lu et al.

(10) Patent No.: US 6,934,873 B2
(45) Date of Patent: Aug. 23, 2005

(54) AUTOMATIC BIOS RECOVERY IN A MULTI-NODE COMPUTER SYSTEM

(75) Inventors: Fang Lu, Austin, TX (US); Frank L. Wu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 479 days.

(21) Appl. No.: 10/085,915

(22) Filed: Feb. 28, 2002

(65) Prior Publication Data

US 2003/0163753 A1 Aug. 28, 2003

(51) Int. Cl.[7] ............................................... G06F 11/00
(52) U.S. Cl. ............................................. 714/2; 713/2
(58) Field of Search .............................. 714/2, 36, 34; 713/2

(56) References Cited

U.S. PATENT DOCUMENTS

| | | | |
|---|---|---|---|
| 5,579,522 A | 11/1996 | Christeson et al. .......... | 395/652 |
| 5,634,079 A | 5/1997 | Buxton ........................ | 395/892 |
| 5,835,695 A | * 11/1998 | Noll .............................. | 714/6 |
| 5,870,520 A | 2/1999 | Lee et al. .............. | 395/182.04 |
| 6,003,130 A | 12/1999 | Anderson ....................... | 713/2 |
| 6,018,806 A | 1/2000 | Cortopassi et al. ............ | 714/8 |
| 6,038,663 A | 3/2000 | Feldman ........................ | 713/1 |
| 6,122,733 A | 9/2000 | Christeson et al. ............ | 713/2 |
| 6,161,177 A | 12/2000 | Anderson ....................... | 713/2 |
| 6,167,532 A | 12/2000 | Wisecup ...................... | 714/23 |
| 6,185,696 B1 | * 2/2001 | Noll .............................. | 714/6 |
| 6,681,292 B2 | * 1/2004 | Creta et al. .................. | 711/119 |
| 2002/0073353 A1 | * 6/2002 | Fish et al. ...................... | 714/2 |
| 2002/0091807 A1 | * 7/2002 | Goodman .................... | 709/221 |
| 2002/0147941 A1 | * 10/2002 | Gentile ........................ | 714/36 |

OTHER PUBLICATIONS

IBM *POWER4 System Microarchitecture*, at internet <http://www-1.ibm.com/servers/eserver/pseries/hardware/whitepapers/power4_7.html> pp. 1–3, Jan. 24, 2002.

IBM *Datacenter–class and HPC servers*, at internet site <http://www-1.ibm.com/servers/eserver/pseries/hardware/datactr/> p. 1, Jan. 24, 2002.

PC Accelerate *Map to the Intel Chipset Maze: The 820 MCH–f*, at internet site <http://www.pcaccelerate.com/Chipsets/i820–1/i820–1.html > pp. 1–3, Jan. 31, 2002.

Tony Smith, The Register *Intel details 16–way DDR–based i870 chipset*, at internet site <http://www.theregister.co.uk/content/archive/21258.html> pp. 1–2, Feb. 27, 2002.

Anthony Cataldo, EE Times *Intel prepares for server chip set revival*, at internet site <http://www.eetimes.com/printableArticle?doc_id=OEG20010823S0066> pp. 1–3, Feb. 27, 2002.

U.S. Appl. No. 10/027,833 entitled *"System and Method for Updating Bios for a Multipe–Node Computer System,"* filed by Frank L. Wu et al.; Dell Products L.P. Assignee (DC–03185), Dec. 21, 2001.

* cited by examiner

Primary Examiner—Scott Baderman
Assistant Examiner—Paul Contino
(74) Attorney, Agent, or Firm—Baker Botts L.L.P.

(57) ABSTRACT

A method of recovering from basic input/output system (BIOS) corruption operates in a multi-node computer system (MCS). The MCS includes first and second nodes, a first firmware unit in the first node, and a second firmware unit in the second node. According to the method, in response to initiation of a boot sequence for the MCS, the MCS automatically checks a BIOS image in the first firmware unit in the first node for corruption. In response to detecting corruption of the BIOS image in the first firmware unit, the MCS automatically recovers from the corruption by causing a good BIOS image to be copied from the second firmware unit in the second node to the first firmware unit in the first node. In one example embodiment, the MCS may contain multiple nodes, and the MCS may automatically recover from BIOS errors if any node contains a good BIOS image.

20 Claims, 3 Drawing Sheets

AUTOMATIC BIOS RECOVERY IN A MULTI-NODE COMPUTER SYSTEM

TECHNICAL FIELD

The present disclosure relates in general to information handling systems. In particular, this disclosure relates to systems, methods, and program products for recovering from basic input/output system (BIOS) problems such as BIOS image corruption in multi-node computer systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system currently involved in intense development efforts is the multi-node computer system (MCS). For instance, in one proposed configuration, the 82870 chipset developed by Intel Corporation (hereinafter the "870 chipset") provides for a four-node system that includes a set of central processing units (CPUs), a CPU hub, an input/output (I/O) hub, and a PCI expansion bus for each node. The CPU hubs may also be called scalable node controllers (SNCs). In addition, the 870 chipset features a multi-port switch, known as a scalability port switch (SPS), in each hub, and the SPS may be configured to interconnect an I/O hub from one node to the CPU hub of another node, for example. SPS configuration is handled by the CPU hubs.

In an MCS, as in more traditional computer systems, a basic input/output system (BIOS) may be used for tasks such as system initialization. However, a problem may be presented when BIOS code in a computer system becomes corrupted, for example as the result of a hardware malfunction.

SUMMARY

The present disclosure relates to a system, a method, and software for automatically recovering from BIOS corruption. In one example embodiment, a multi-node computer system (MCS) features first and second nodes containing first and second sets of central processing units (CPUs), respectively. The first and second nodes also include first and second firmware units, respectively, and each firmware unit contains BIOS code. In addition, the MCS includes BIOS recovery logic, in at least one of the first and second firmware units, that automatically recovers from BIOS corruption. For example, the BIOS recovery logic may automatically detect corruption in the BIOS code in the first node and, in response, automatically replace the corrupt BIOS code with good BIOS code from the second node.

By contrast, in prior systems, when the BIOS gets corrupted, the typical recovery process is a manual, time-consuming process. For instance, the user may be required to perform the following manual steps:
 (1) determine that the BIOS has malfunctioned,
 (2) power off the system,
 (3) open the chassis,
 (4) set a jumper,
 (5) insert into a disk drive a recovery media such as a floppy disk with a clean BIOS,
 (6) power on the system to start recovery,
 (7) verify successful BIOS recovery,
 (8) reboot the system, and
 (9) reassemble the chassis.

According to the process of the present disclosure, the BIOS may be recovered without any manual intervention.

Various features of one or more embodiments of the present invention are described at some length below, with reference to one or more example implementations. Upon review of this disclosure, numerous additional advantages and alternative embodiments of the invention will be readily apparent to those of ordinary skill in the art.

BRIEF DESCRIPTION OF THE DRAWINGS

The present disclosure and its numerous objects, features, and advantages may be more fully understood by reference to the following description of an example embodiment and the accompanying drawings, in which.

DETAILED DESCRIPTION OF AN EXAMPLE EMBODIMENT

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices, and various input and output (I/O) devices, such as a keyboard, a mouse, and a video display. The information handling system may also include one or more buses operable to transmit communications between the various hardware components.

Figure 1:
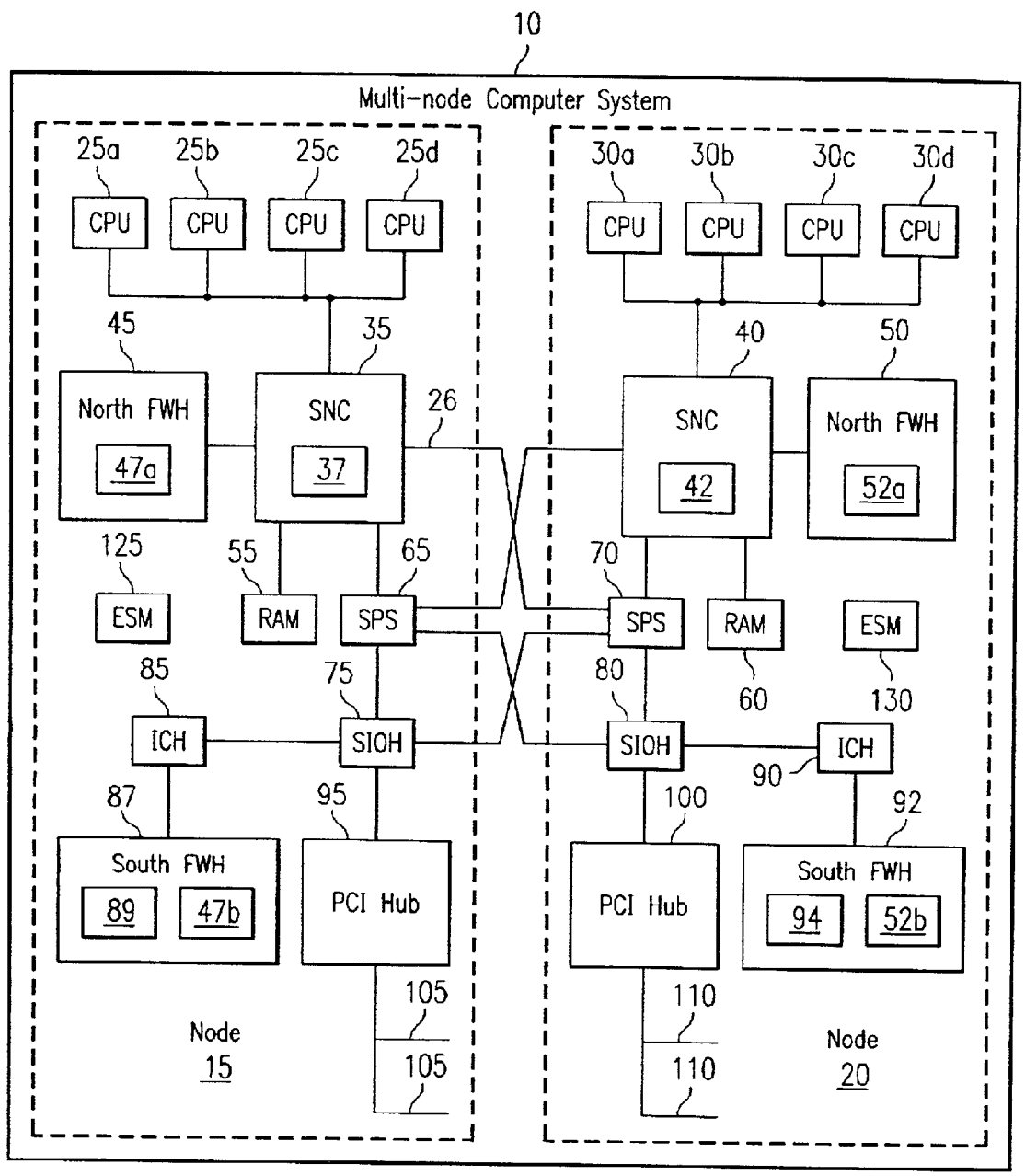
FIG. 1 presents a block diagram of an example embodiment of a multi-node computer system with support for automatic BIOS recovery.

Referring now to FIG. 1, there is illustrated an information handling system 10 that includes two or more nodes 15 and 20, with each node containing its own set of processors and I/O. Information handling system 10 may also be called a multi-node computer system (MCS) 10. In the illustrated embodiment, MCS 10 is implemented using a chipset, such as the 870 chipset, that allows the nodes to share processing resources, such as CPUs, and to share I/O resources, such as connections to disk drives or other storage or I/O devices. Consequently, MCS 10 enjoys increased computing power and I/O flexibility, and MCS 10 provides increased capabilities for parallel processing and storage, network, and data I/O, relative to previous architectures.

Specifically, in the example embodiment, node 15 includes one or more CPUs 25a–25d coupled to a CPU hub 35. CPU hub 35 provides access to a CPU firmware unit 45 and to RAM 55. In the example embodiment, CPU firmware unit 45 contains a system BIOS 47a for initializing components of node 15 such as CPUs 25a–25d, RAM 55, and I/O. CPU firmware unit 45 may also be called a north firmware hub (FWH) 45. Similarly, node 20 includes a set of one or more CPUs 30a–30d, a CPU firmware unit 50 containing BIOS code 52a, and RAM 60, all interconnected by a CPU hub 40. In the example embodiment, CPU hubs 35 and 40 are implemented as scalable node controllers (SNCs) 35 and 40, and SNCs 35 and 40 serve as memory controllers and host bridges for their respective nodes. For example, some of the functions performed by SNC 35 may be functions traditionally performed by a north bridge.

Furthermore, in addition to the connections described above, SNC 35 connects to two multi-port switches for internodal communications 65 and 70. One of those multi-port switches 65 resides within node 15, and the other multi-port switch 70 resides in node 20. Similarly, CPU hub 40 connects to multi-port switch 65 and to multi-port switch 70. In the example embodiment, multi-port switches 65 and 70 are implemented as scalability port switches (SPSs) 65 and 70. Thus, the SNC in each node is operable to provide a connection with the SPS of the other node.

Node 15 also includes an I/O hub 75, which is connected to SPS 65. In addition, I/O hub 75 is connected to SPS 70 from node 20. Likewise, node 20 includes an I/O hub 80 that is connected to SPS 70 and to SPS 65 in node 15. I/O hubs 75 and 80 may also be called south I/O hubs (SIOHs) 75 and 80.

A peripheral component interconnect (PCI) hub 95 and an I/O FWH 87 are connected to SIOH 75, possibly via an I/O controller hub (ICH) 85. PCI hub 95 is connected to one or more PCI slots 105, which enable adapter cards to be added to MCS 10. Similarly, in node 20, I/O hub 80 is connected (possibly via an ICH 90) to SPS 70, to an I/O FWH 92, and to a PCI hub 100 with access to one or more PCI slots 110. I/O FWHs 87 and 92 may also be called South FWHs 87 and 92.

According to the example embodiment, South FWH 87 includes a South BIOS image 89, as well as a spare copy 47b of system BIOS 47a. Likewise, South FWH 92 includes a South BIOS image 94, as well as a spare copy 52b of the system BIOS. As explained in greater detail below, spare copies 47b and 52b may be used to recover from BIOS errors in system BIOS 47a and 52a. South BIOS images 89 and 94 may include BIOS code for adapter ROMs and extended system configuration data (ESCD), for example. The various firmware units/hubs store data such as the BIOS images using any suitable storage components, including nonvolatile memory technologies such as read only memory (ROM), electrically erasable programmable read only memory (EEPROM), flash memory, etc.

Figure 2:
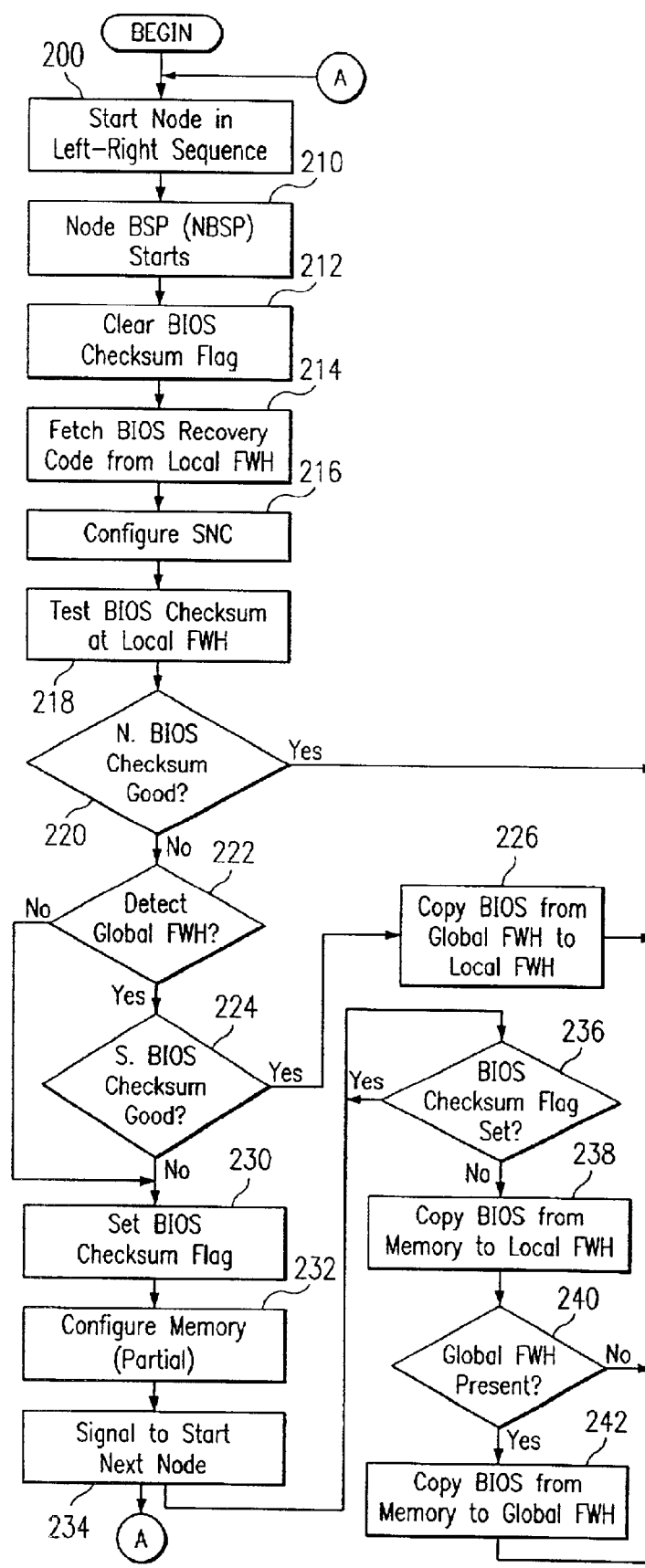
FIG. 2 presents a flowchart of an example embodiment of a process for automatically performing BIOS recovery.

Referring now to FIG. 2, a flowchart illustrates an example embodiment of a process for automatically recovering from BIOS errors such as corruption. The illustrated process involves nodes 15 and 20 in MCS 10. However, in alternative embodiments, a similar process could be used to perform BIOS recovery in multi-node computer systems with more than two nodes. The example process begins with MCS 10 starting an initialization process, for example in response to being powered up or reset. Embedded service management (ESM) software in MCS 10 then uses a left-to-right sequence to select a start node (e.g., node 15) and a bootstrap processor (BSP) (e.g., CPU 25a) within the selected boot node, as shown at blocks 200 and 210. As depicted in FIG. 1, each node may include an ESM software module 125 or 130, for example. ESM modules 125 and 130 may be implemented, for example, as firmware, as hardwired hardware modules, as configurable hardware modules such as field programmable devices (FPDs), etc. As shown at block 212, MCS 10 then clears a BIOS checksum flag for the current node (i.e., MCS 10 sets that flag to zero). For example, the checksum flag may be stored in a nonvolatile scratch pad memory 37, in SNC 35 (or, for node 20, a scratch pad 42). At block 214, MCS 10 then retrieves the BIOS recovery code from North FWH 45 and begins executing that code.

Figure 3:
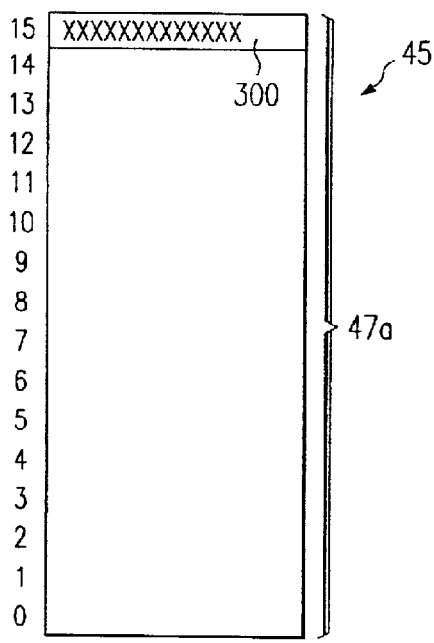
FIGS. 3–4 present example memory maps for two firmware units from FIG. 1.

For instance, FIG. 3 depicts a memory map for North FWH 45, and that map show that, in the current implementation, BIOS image 47a occupies 16 blocks of storage. A particular one of those blocks (in this case, block 15) may contain the error recovery code 300. Error recovery code 300 may also be called "minimum capability code" or simply "recovery code." Also, North FWH 50 may contain substantially the same BIOS image as North FWH 45.

At block 216 of FIG. 2, error recovery code 300 uses SNC 35 to open ports in SPS 65 to other nodes, such as node 20. Specifically, error recovery code 300 configures SNC 35 and SPS 65 in a way that allows other nodes to communicate with node 15 via SPS 65. This configuration process may be called strapping the minimum hardware path.

Figure 5:
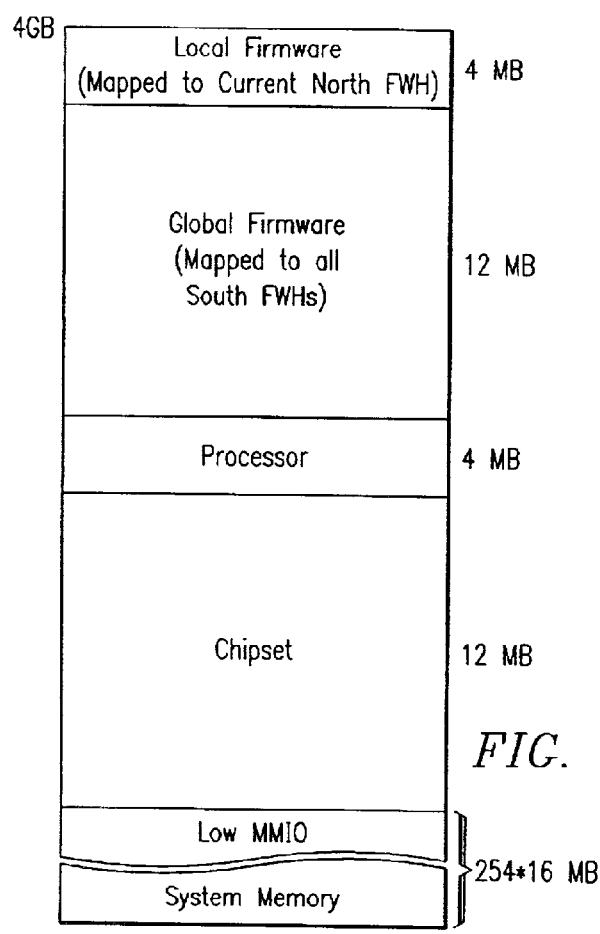
FIG. 5 presents an example memory map for the multi-node computer system of FIG. 1.

At block 218, error recovery code 300 then checks system BIOS 47a for problems, for instance by computing a checksum to determine whether system BIOS 47a has been corrupted. As shown at block 222, if system BIOS 47a is corrupt, error recovery code 300 checks for the presence of South FWH 87. For instance, FIG. 5 depicts an example memory map for MCS 10, and a region in the uppermost portion of that memory space may be reserved for hardware management purposes. Specifically, in the example embodiment, the region reserved for hardware management purposes may be a 32 megabyte (MB) region right before the 4 gigabyte (GB) mark. As illustrated, the 4 MB region right below 4 GB may be called the local firmware region, and that region may provide a window into the North FWH of the current node. Also, the next 12 MB may be known as the global firmware region, and that region may provide a window into the South FWH of the current node.

If error recovery code 300 detects South FWH 87, error recovery code 300 then determines whether the checksum for the contents of South FWH 87 are good, as shown at block 224. At block 226, if the checksum is good, error recovery code 300 copies the spare copy 47b of the system BIOS from South FWH 87 to North FWH 45 to recover system BIOS 47a.

However, if the checksum for spare BIOS 47b is not good, or if South FWH 87 is not detected, the process passes to block 230, and a BIOS checksum flag is set for the current node. At block 232 error recovery code 300 configures a portion of RAM 55 to make that portion ready to store and return data. For instance, with reference to FIG. 5, error recovery code 300 may initialize a 1 MB portion of RAM starting at a particular address in the system memory block. At blocks 234 and 236, error recovery code 300 then signals the next node in the left-to-right sequence to start and enters a loop waiting for the checksum flag for the current node to get cleared.

As indicated by connector A, which connects block 234 to block 200, when the next node is started, the above process is then initiated in the new node. The new node would then clear its checksum flag, fetch recovery code, etc. If the checksum for system BIOS 47a in the new node is good, the process will eventually pass from block 200 to block 244. Similarly, if the first node has a good BIOS image in North FWH 45, process passes from block 200 to block 244.

Error recovery code 300 then tests whether the checksum flag for the left node (if any) is set. For example, if node 15 had a bad system BIOS image in North FWH 45, and a bad system BIOS image in South FWH 87 or without South FWH 87, the checksum flag for node 15 would be set at block 230. If node 20 then had a good BIOS image in North FWH 50 or South FWH 92, when node 20 gets to block 244, it will test the checksum flag for node 15. If additional nodes were provided, those nodes would likewise test the flag for the previous (left) node. In the example embodiment, for each node that has started the initiation process, that node will have also opened its SPS ports to other nodes (see block 216). The current node may use those paths to check the flags in the SNCs of the other nodes.

If the checksum flag in the left node is set, at block 246 the current node copies the system BIOS from the current North FWH to the region of memory in the left node that was configured at block 232. At block 248 the current node then release the left node from its wait loop (see block 236) by clearing the checksum flag for the left node. Error recovery code 300 for the current node then configures all of the local RAM at block 249. However, if the determination at block 244 is negative, the current node bypasses blocks 246 and 248 and then configures its RAM at block 249.

At block 250 the current node then tests whether the node to the right is accessible. If it is not, the current node signals the right node to start, and the right node begins processing at block 200, as indicated by block 252 and connector A. The current node then determines whether all nodes are synchronized at block 254. For instance, each node may set a synchronization flag when that node has completed initialization, and error recovery code 300 may check those flags, or error recovery code 300 may simply wait a predetermined interval to give each node enough time to recover if necessary.

Once all of the nodes are synchronized, a system bootstrap processor (SBSP) is selected at block 256. At block 258 the other processors in MCS 10 are then marked as application processors (APs). At blocks 260 and 262 the APs are halted and the SBSP is started. The SBSP may continue operations, for instance by performing power on self test (POST) instructions, configuring the RAM from all of the nodes as one logical memory structure, etc.

Referring again to block 236, when a node is released from its wait loop, that node then copies the BIOS image from system memory to the North FWH, as indicated at block 238. Of course, before a node is released from its wait loop, another node will have loaded a BIOS image into the system memory for the node being released, as indicated at block 246. After the current node loads the good BIOS image to the North FWH, the current node checks for a South FWH and, if one is found, loads the good BIOS to the South FWH as well, as depicted at blocks 240 and 242. The process for the current node then reaches block 244 and proceeds as described above.

In one alternative embodiment, the recovery code could steps through each node, checking the North FWHs for a good copy of the BIOS, and attempting to recover from the South FWHs only after determining that the system BIOS images in each of the North FWHs are corrupt. Consequently, the sequence of scanning for a good BIOS image need not necessarily step directly to the I/O module of a node after a corrupted BIOS is found in the CPU module for that node. Instead, the scan sequence could step directly from one CPU module to another upon detection of corruption.

In addition, the recovery code could log recovery information about detected BIOS problems and attempted recovery operations during the recovery process. For instance, the recovery information may be stored in scratch pad 37 or scratch pad 42. Consequently, although the recovery process may be automatic, the logged information may nevertheless allow system administrators to track BIOS errors.

Figure 4:
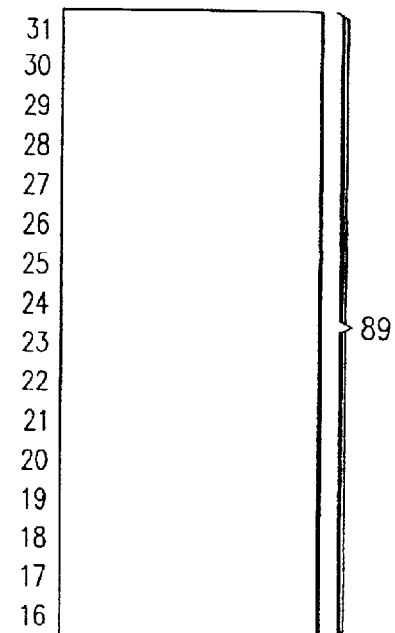

With reference now to FIG. 4, an example memory map for South FWH 87 shows that I/O data 89 (such as ESCD data) occupies one portion of South FWH 87, while the spare copy 47b of the system BIOS resides in another portion of South FWH 87. South FWH 92 may have the same or similar contents as South FWH 87.

In conclusion, as will be evident from the above description, the recovery process is system self-directed, and requires no user interaction. Since each node with a corrupted BIOS configures itself to allow communication from other nodes (e.g., by setting the SNC, the SPS, and a portion of the memory), once a good BIOS image is found, that BIOS image may be distributed to all of the nodes that need BIOS recovery. For instance, the good BIOS image may cascade in sequence from right to left through the nodes with corrupted BIOS images. In different implementations, the distribution details could vary. For example, the MCS could recover one node at a time and then reboot the system to recover that next node. Alternatively, the BIOS for all nodes could be recovered at once before the system is rebooted. Since the hardware path from the SNC/SPS down to the firmware hub at the I/O module may be configured as a result of hardware strapping, access to the South FWH may always be guaranteed. Each node may test its South FWH for a good copy of the System BIOS, throughout all the South FWHs until a good BIOS copy is found. The good BIOS may then be distributed to all the nodes that need BIOS recovery. Again, the distribution can be different depending on the implementation.

Since the MCS has at least two nodes, there are always at least two copies of the BIOS image. Furthermore, when considering the South FWHs, additional copies of the system BIOS may also be available. The recovery process is therefore highly reliable. Another advantage of the recovery process is that, since there are already multiple copies of the system BIOS image in the MCS, there is no need to have a dedicated firmware module simply to hold a copy of the system BIOS for recovery purposes only. Additionally, when implemented for chipsets such as the 870 chipset that support both IA-32 and IA-64 systems, the method may perform automatically BIOS recovery for both IA-32 and IA-64 instruction-set architectures.

Although the present invention has been described with reference to one or more example embodiments, those with ordinary skill in the art will understand that numerous variations of the illustrated embodiments could be practiced without departing from the scope and spirit of the present invention. For example, MCS 10 includes two substantially symmetrical nodes 15 and 20. In some alternative embodiments, two or more nodes could include respective sets of CPUs, and CPU hubs; however, those nodes might share a common I/O hub and a common south firmware unit. The process described above may easily be altered to provide for recovery in that type of MCS or for other types of MCSs.

It should also be understood that the hardware and software components depicted in the example embodiment represent functional elements that are reasonably self-contained so that each can be designed, constructed, or updated substantially independently of the others. In alternative embodiments, however, it should be understood that many of the components, including the recovery code, may be implemented as hardware, software, or combinations of hardware and software for providing the functionality described and illustrated herein. The recovery code may also be called BIOS recovery control logic, to denote various implementations, including software instructions, hardwired logic circuitry, etc.

Alternative embodiments of the invention also include computer-usable media encoding computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic or optical carriers. The recovery instructions may also be referred to as a program product.

Many other aspects of the illustrated embodiments may also be changed in alternative embodiments without departing from the scope and spirit of the invention. The scope of the invention is therefore not limited to the particulars of the illustrated embodiments or implementations but is defined by the appended claims.

What is claimed is:

1. A method of recovering from basic input/output system (BIOS) corruption in a multi-node computer with a first node including a first central processing unit (CPU) hub and a second node including a second central processing unit (CPU) hub, a first firmware unit in the first node, a second firmware unit in the second node, and a multi-port switch for internodal communications the method comprising:

configuring the multi-port switch to provide a communication path between the first CPU hub and the second CPU hub with an error recovery code;

in response to initiation of a boot sequence for the multi-node computer, automatically checking a BIOS image in the first firmware unit in the first node of the multi-node computer for corruption;

determining if the second firmware unit contains a good copy of the BIOS image; and in response to detecting corruption of the BIOS image in the first firmware unit, and in response to determining that the second firmware unit contains a good copy of the BIOS image, automatically recovering from the corruption of the BIOS image by copying a good BIOS image from the second firmware unit in the second node to the first firmware unit in the first node.

2. The method of claim 1, wherein:

the multi-node computer comprises multiple nodes, with each node comprising a central processing hub and containing a copy of the BIOS image; and the method further comprises:

determining if any of the nodes contain a good copy of the BIOS image; and in response to determining that at least one node contains the good copy of the BIOS image, automatically copying the good copy of the BIOS image to any nodes that contain a corrupted copy of the BIOS image.

3. The method of claim 1, wherein:

the operation of automatically recovering from the corruption of the BIOS image comprises copying the good BIOS image from the second node to the first node via the multi-port switch.

4. The method of claim 1, wherein:

the first firmware unit comprises a central processing unit (CPU) firmware unit;

the multi-node computer also includes an input/output (I/O) firmware unit; and the method further comprises:

in response to detecting corruption of the BIOS images in the CPU firmware unit, automatically copying a good BIOS image from the I/O firmware unit to the CPU firmware unit.

5. The method of claim 4, wherein:

further comprising the multi-port switch for internodal communications communicatively interposed between the first CPU hub and the I/O firmware unit; and the operation of automatically recovering from the corruption of the BIOS image comprises obtaining the good BIOS image from the I/O firmware unit via the multi-port switch.

6. The method of claim 4, wherein:

the method further comprises automatically using a good BIOS image in an I/O firmware unit in the second node to replace first and second bad BIOS images in the CPU firmware units in the first and second nodes, respectively.

7. The method of claim 1, wherein:

the multi-node computer comprises multiple nodes;

each node comprises at least one copy of the BIOS image in a central processing unit (CPU) firmware unit and at least one additional copy of the BIOS image in an input/output (I/O) firmware unit;

each node further comprises a set of one or more CPUs;

each node further comprises a CPU hub interposed between the CPU firmware unit and the set of one or more CPUs;

each node further comprises a multi-port switch for internodal communication and an I/O hub interposed in series between the CPU hub and the I/O firmware unit; and the method further comprises:

checking the CPU firmware units and the I/O firmware units to determine if any of the nodes contain a good copy of the BIOS image; and in response to determining that at least one of the nodes contains the good copy of the BIOS image, automatically copying the good copy of the BIOS image to all nodes that contain corrupted copies of the BIOS image.

8. The method of claim 1, further comprising logging recovery information for future reference.

9. A multi-node computer with automatic basic input/output system (BIOS) recovery, the multi-node computer comprising:
   a first node that includes a first set of one or more central processing units (CPUs) communicatively connected with a first CPU hub;
   a second node communicatively connected to the first node, wherein the second node includes a second set of one or more CPUs communicatively connected with a second CPU hub;
   a multi-port switch for internodal communications communicatively connected to the first CPU hub and the second CPU hub and configured by an error recovery code to provide a communication path between the first CPU hub and the second CPU hub;
   a first firmware unit in the first node, communicatively connected to the first set of one or more CPUs;
   BIOS code in the first firmware unit;
   a second firmware unit in the second node that also contains the BIOS code, the second firmware unit communicatively connected to the second set of one or more CPUs; and
   BIOS recovery logic, in at least one of the first and second firmware units, that determines if the second firmware unit contains a good copy of the BIOS code, and automatically recovers from BIOS corruption by causing a copy of the BIOS code from the second firmware unit in the second node to be copied to the first firmware unit in the first node, in response to detecting corruption in the BIOS code in the first node, and in response to determining that the second firmware unit contains a good copy of the BIOS code.

10. The multi-node computer of claim 9, wherein:
    the multi-node computer comprises multiple nodes, with each node containing a copy of the BIOS code;
    the BIOS recovery logic; and
    in response to determining that at least one node contains the good copy of the BIOS code, the BIOS recovery logic automatically causes the good copy of the BIOS code to be copied to any nodes that contain a corrupted copy of the BIOS code.

11. The multi-node computer of claim 9, further comprising:
    the first CPU hub in the first node communicatively interposed between the first firmware unit and the first set of one or more CPUs;
    the second CPU hub in the second node communicatively interposed between the second firmware unit and the second set of one or more CPUs; and wherein:
    the BIOS recovery logic configures the multi-port switch to provide a communication path between the first CPU hub and the second CPU hub; and
    the BIOS recovery logic causes copies the good BIOS code from the second node to the first node via the multi-port switch.

12. The multi-node computer of claim 9, wherein:
    the first and second firmware units comprise first and second central processing unit (CPU) firmware units;
    the multi-node computer further comprises an input/output (I/O) firmware unit communicatively connected to at least one of the first and second CPU firmware units;
    the I/O firmware unit also contains the BIOS code; and
    in response to detecting corruption of the BIOS code in the first CPU firmware unit, the BIOS recovery logic automatically causes the BIOS code to be copied from the second I/O firmware unit to the first CPU firmware unit.

13. The multi-node computer of claim 12, wherein:
    the multi-port switch communicatively interposed between the first CPU hub and the I/O firmware unit; and
    the BIOS recovery logic causes the BIOS code to be copied from the I/O firmware unit via the multi-port switch.

14. The multi-node computer of claim 13, wherein:
    the multi-node computer further comprises an I/O hub communicatively interposed between the multi-port switch and the I/O firmware unit; and
    the BIOS recovery logic causes the BIOS code to be copied from the I/O firmware unit via the I/O hub.

15. The multi-node computer of claim 9, wherein:
    the multi-node computer comprises multiple nodes;
    each node comprises a set of one or more CPUs;
    each node further comprises a CPU firmware unit communicatively connected to the set of one or more CPUs;
    each node further comprises the CPU hub interposed between the CPU firmware unit and the set of one or more CPUs;
    each node further comprises an input/output (I/O) firmware unit communicatively connected to the CPU hub;
    each node further comprises at least one copy of the BIOS code in the CPU firmware unit and at least one copy of the BIOS code in the I/O firmware unit;
    each node further comprises a multi-port switch for internodal communication and an I/O hub interposed in series between the CPU hub and the I/O firmware unit;
    the BIOS recovery logic checks the CPU firmware units and the I/O firmware units to determine if any of the nodes contain a good copy of the BIOS code; and
    in response to determining that at least one of the nodes contains the good copy of the BIOS code, the BIOS recovery logic automatically causes the good copy of the BIOS code to be copied to all nodes that contain corrupted copies of the BIOS code.

16. A program product that provides automatic basic input/output system (BIOS) recovery in a multi-node computer system with first and second nodes, a first firmware unit communicatively connected with a first CPU hub in the first node, a second firmware unit communicatively connected with a second CPU hub in the second node and a multi-port switch for internodal communications communicatively connected to the first CPU hub and the second CPU hub, the program product comprising:
    a computer-usable medium encoding recovery instructions which, when executed, perform operations comprising:
    configuring the multi-port switch to provide a communication path between the first CPU hub and the second CPU hub with an error recovery code;
    in response to initiation of a boot sequence for the multi-node computer, automatically checking a BIOS image in the first firmware unit in the first node of the multi-node computer for corruption; automatically determining if the second firmware unit contains a good copy of the BIOS image; and in response to detecting corruption of the BIOS image in the first firmware unit, and in response to determining that the second firmware unit contains a good copy of the BIOS image, automatically recovering from the corruption of the BIOS image by causing a good BIOS image from the second firmware unit in the second node to be copied to the first firmware unit in the first node.

17. The program product of claim 16, wherein:

the multi-node computer comprises multiple nodes with each node containing a copy of the BIOS image; and the operations performed by the recovery instructions further comprise;

determining if any of the nodes contain a good copy of the BIOS image; and in response to determining that at least one node contains the good copy of the BIOS image, automatically copying the good copy of the BIOS image to any nodes that contain a corrupted copy of the BIOS image.

18. The program product of claim 16, wherein:

the operation of automatically recovering from the corruption of the BIOS image comprises copying the good BIOS image from the second node to the first node via the multi-port switch.

19. The program product of claim 16, wherein:

the first firmware unit comprises a central processing unit (CPU) firmware unit;

the multi-node computer further comprises an input/output (I/O) firmware unit; and the operations performed by the recovery instructions further comprise:

in response to detecting corruption of the BIOS image in the CPU firmware unit, automatically causing a good BIOS image from the I/O firmware unit to be copied to the CPU firmware unit.

20. The program product of claim 16, wherein the operations performed by the recovery instructions further comprise logging recovery information for future reference.

* * * * *